US008512451B1

(12) United States Patent
Heumann

(10) Patent No.: US 8,512,451 B1
(45) Date of Patent: Aug. 20, 2013

(54) CYCLONE SEPARATOR ARRANGEMENT

(76) Inventor: William L. Heumann, Prospect, KY (US)

( * ) Notice: Subject to any disclaimer, the term of this patent is extended or adjusted under 35 U.S.C. 154(b) by 40 days.

(21) Appl. No.: 13/267,931

(22) Filed: Oct. 7, 2011

(51) Int. Cl.
*B01D 45/12* (2006.01)

(52) U.S. Cl.
USPC .................. 95/271; 55/400; 55/408; 55/409; 55/418; 55/419; 55/348; 55/349; 55/447; 55/459.2; 55/459.1

(58) Field of Classification Search
USPC ........... 55/348, 349, 447, 459.2, 459.4, 459.1
See application file for complete search history.

(56) References Cited

U.S. PATENT DOCUMENTS

| | | | | |
|---|---|---|---|---|
| 1,757,432 | A | 5/1930 | Kamrath | |
| 1,970,077 | A | 8/1934 | Collins | |
| 1,197,125 | A | 4/1935 | Soyez et al. | |
| 2,059,521 | A | 11/1936 | Hawley | |
| 2,082,242 | A | 6/1937 | Bowen | |
| 2,331,786 | A | 10/1943 | Lincoln | |
| 2,472,995 | A | 6/1949 | Watson et al. | |
| 2,542,549 | A | 2/1951 | McBride | |
| 2,717,054 | A | 9/1955 | Petersen | |
| 2,806,551 | A | 9/1957 | Heinrich | |
| 2,874,801 | A * | 2/1959 | Van Der Kolk | 55/348 |
| 3,448,563 | A | 6/1969 | Sobeck | |
| 3,716,003 | A | 2/1973 | Battcock | |
| 3,969,096 | A * | 7/1976 | Richard | 55/455 |
| 6,022,390 | A | 2/2000 | Kakkula | |
| 7,070,645 | B2 | 7/2006 | Hiltunen et al. | |

FOREIGN PATENT DOCUMENTS

| | | |
|---|---|---|
| EP | 0581977 | 2/1994 |
| GB | 545624 | 6/1942 |
| GB | 550936 | 9/1946 |
| GB | 2092483 | 8/1982 |
| WO | WO 9932583 | 7/1999 |

* cited by examiner

*Primary Examiner* — In Suk Bullock
*Assistant Examiner* — Dung H Bui
(74) *Attorney, Agent, or Firm* — Camoriano & Associates; Theresa Camoriano; Guillermo Camoriano

(57) ABSTRACT

A cyclone separator arrangement is made by forming a hollow cylindrical wall, making an L-shaped cut beginning at a first open end of the wall to form a flap, bending the flap inwardly to form a tangential inlet, enclosing the open end of the wall, and providing an outlet tube extending through the first end into the interior of said cylindrical wall along the central longitudinal axis.

6 Claims, 4 Drawing Sheets

CYCLONE SEPARATOR ARRANGEMENT

BACKGROUND OF THE INVENTION

The present invention relates to a cyclone separator arrangement, and, in particular, to an efficient, inexpensive method for manufacturing a cyclone separator arrangement.

In a cyclone, there is at least one inlet for introducing particulate-laden gas into the cyclone. That gas then travels a spiral route, using centrifugal force to throw the particles against the cylindrical wall of the cyclone, where it is separated from the air. The clean air leaves the cyclone through an outlet tube, and the particulate matter typically falls out the bottom of the cyclone. In general, in order to form the cyclone inlet, it is necessary to weld pieces onto the cyclone wall to form an inlet nozzle or an inlet vane. This makes the construction of the cyclone expensive.

SUMMARY OF THE INVENTION

The present invention includes a method of making a cyclone arrangement that permits much more efficient and inexpensive construction of the cyclone, wasting less material, and requiring substantially less labor. Since this method makes it as inexpensive to make many small inlets as to make one large inlet, it allows for greater collection efficiency as well as a more even distribution of gas removal.

DESCRIPTION

Figure 1:
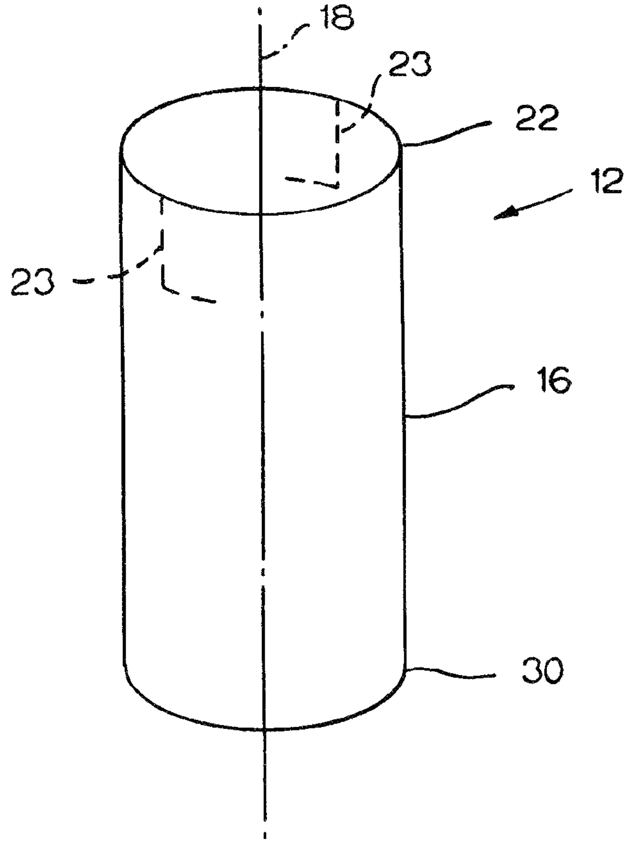
FIG. 1 is a perspective view of the first step of making a cyclone separator in accordance with the present invention.

In order to make the cyclone separator 12, a continuous hollow cylindrical wall 16 is formed, as shown in FIG. 1. The hollow cylindrical wall 16 may be formed by a variety of known methods, including casting, forming from a sheet, and so forth. The hollow cylindrical wall 16 defines an interior and an exterior, an open first end 22, an open second end 30 opposite the first end 22, and a central longitudinal axis 18.

Figure 2:
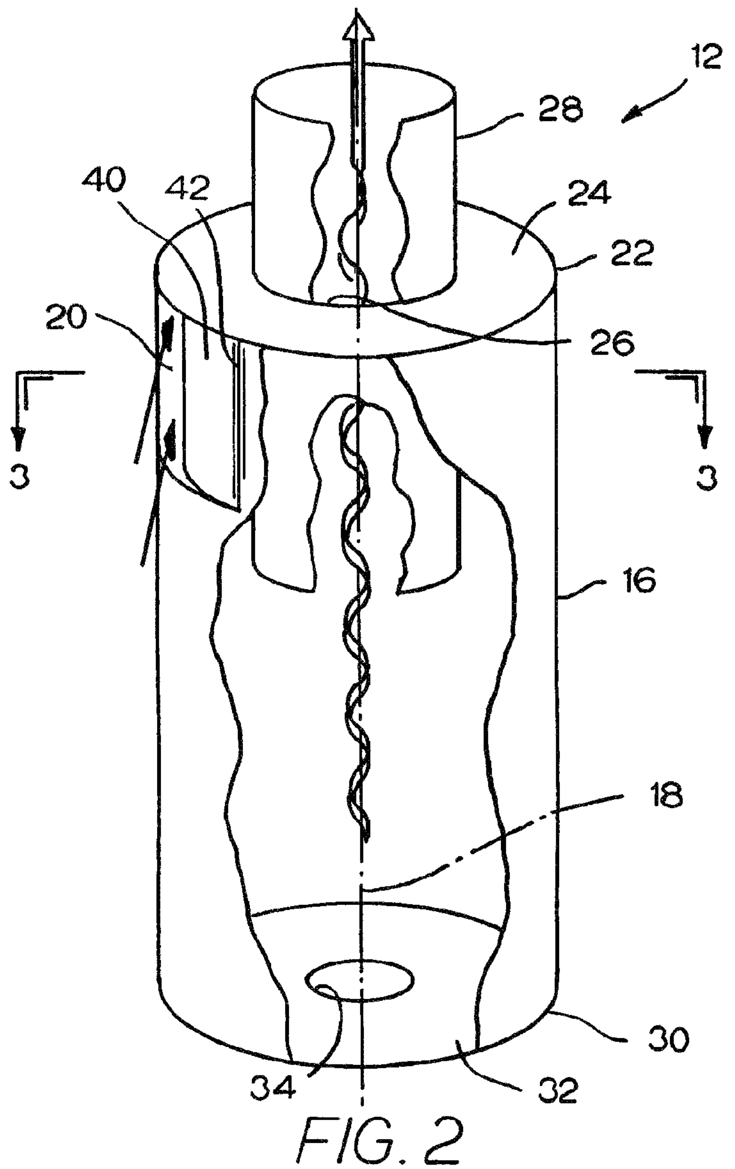
FIG. 2 is a broken-away perspective view of the cyclone separator of FIG. 1, at a later stage of construction.
Figure 3:
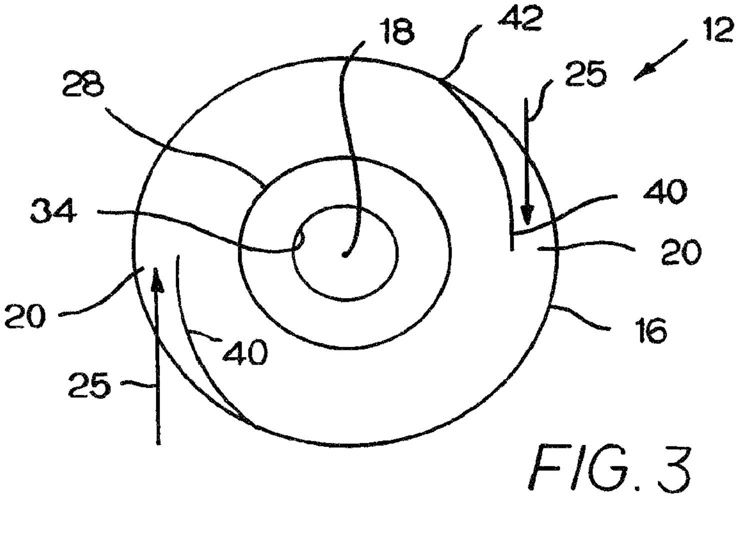
FIG. 3 is a view along line 3-3 of FIG. 2.

Then, one or more L-shaped cuts 23 are made in the wall, as shown in broken lines in FIG. 1. Each L-shaped cut 23 begins at the open first end 22 and forms a flap 40 (See FIG. 2), which is then bent inwardly, toward the longitudinal axis 18, as shown in FIGS. 2 and 3, to form an inlet opening into the cyclone separator 12. In this embodiment, each L-shaped cut 23 includes a first leg, extending parallel to the longitudinal axis 18, and a second leg that follows the curvature of the cylindrical wall 16 and extends in a direction that is perpendicular to the first leg. In this particular embodiment, there are two opposed inlet openings 20, located 180 degrees apart. However, there may be any number of inlet openings, as desired.

It is contemplated that the cutting and bending of the flaps 40 will be done by an automated machine, making the process very efficient and inexpensive. The cutting and bending may, in fact, be done in a single motion.

As shown in FIG. 3, the flaps 40 have been bent slightly inwardly, generally keeping their original curvature, in order to form tangential inlets 20, so that the particulate-laden gas will enter in a direction that is tangential to the wall 16, as shown by the arrows 25 of FIG. 3.

The open first end 22 is then enclosed with an enclosure 24, and an outlet tube 28 extends through the enclosure 24 and into the interior of the hollow cylindrical wall 16. The joint between the outlet tube 28 and the enclosure 24 is tight in order to minimize leakage of gas through the joint.

Figure 4:
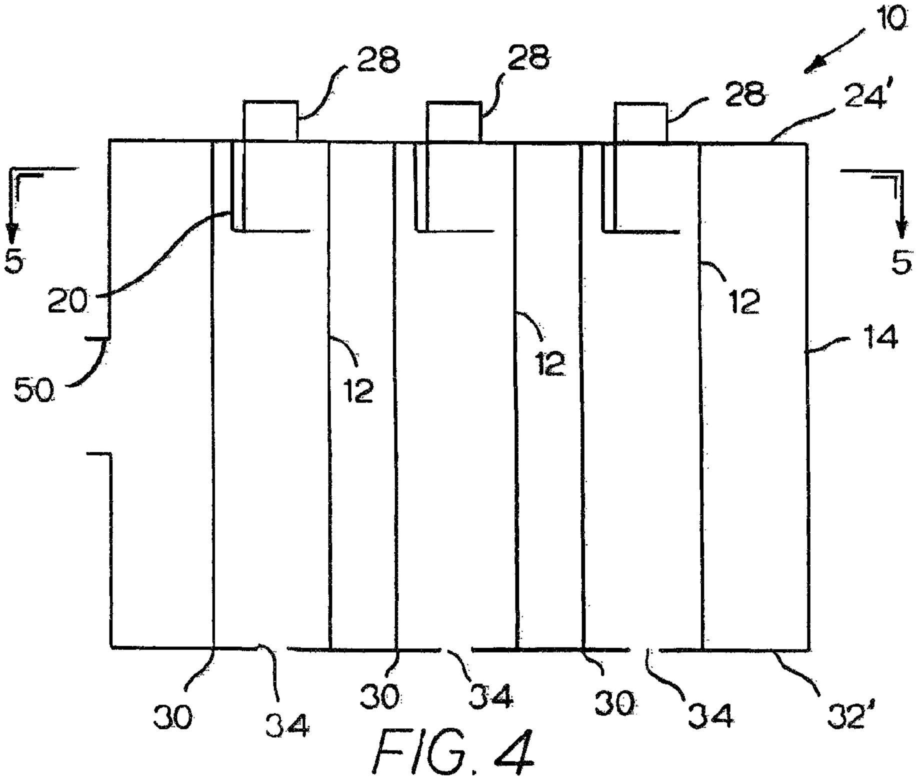
FIG. 4 is a schematic section view through an array of cyclone separators.
Figure 5:
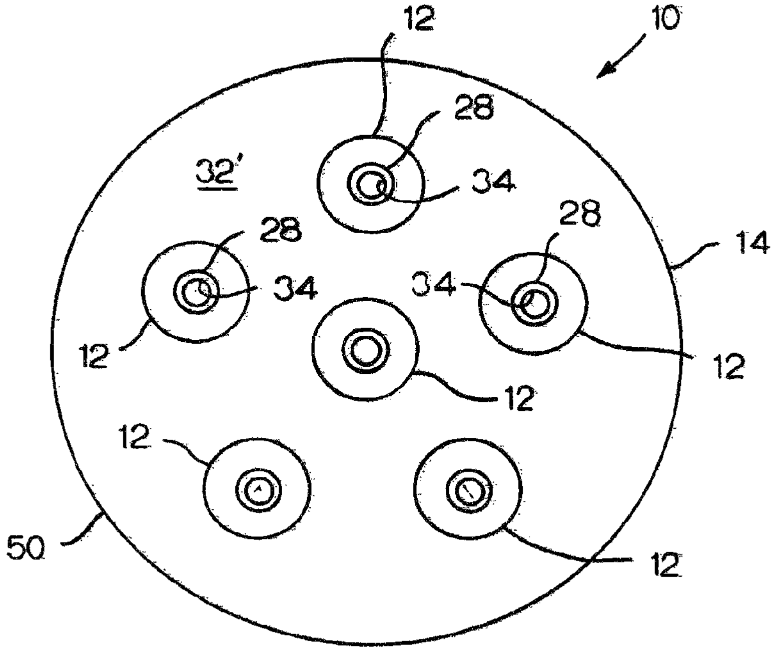
FIG. 5 is view along line 5-5 of FIG. 4.
Figure 6:
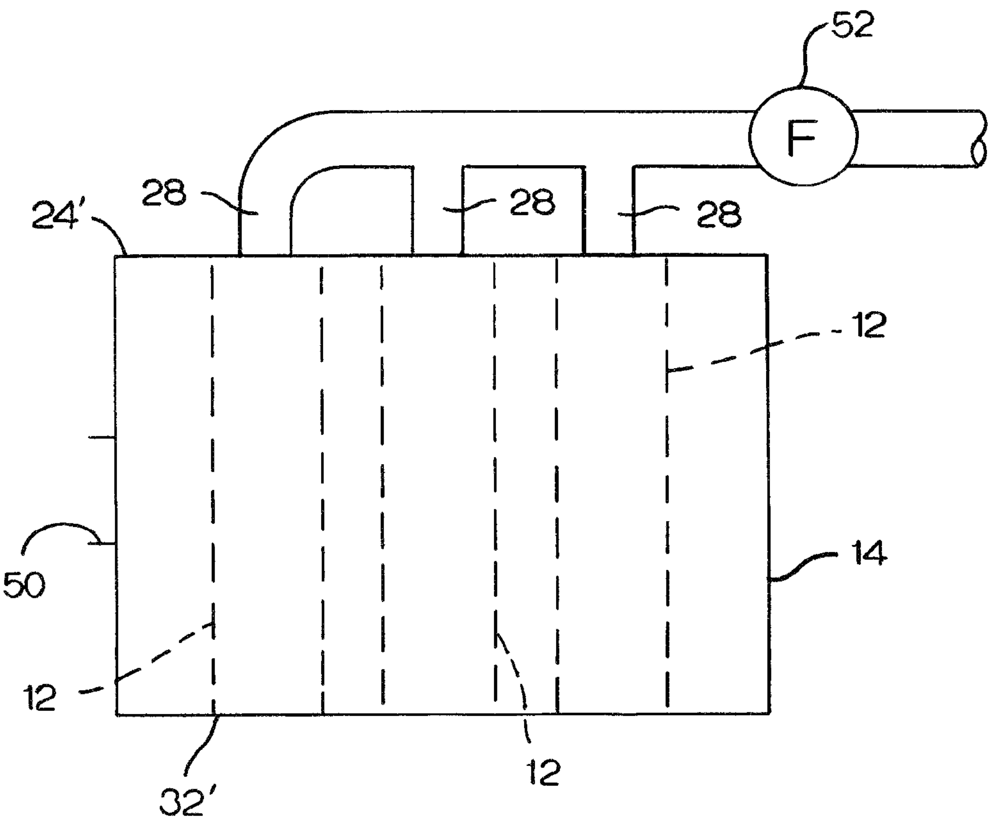
FIG. 6 is a schematic front view of the array of FIG. 4.

FIGS. 4-6 show an array 10 of cyclone separators 12 housed in a common plenum 14. The plenum 14 in this embodiment is a cylindrical body with an upper cap 24', which serves as the enclosure for the first ends 22 of all the cyclone separators 12. An outlet pipe 28 extends through the upper cap 24' at each cyclone separator 12 and has a tight joint with the upper cap 24' so air does not leak between the outlet pipe and the upper cap 24'. The bottom 32 of the plenum 14 is tightly joined with the outer surfaces of the cyclone separators 12, so air does not leak between the bottom 32 and the separators 12, and the open bottom ends 30 of the cyclone separators 12 project downwardly beyond the bottom 32 of the plenum 14. The particulates that are separated out of the gas stream in each cyclone separator 12 fall out the open bottom 30.

The plenum or enclosure 14 has an inlet opening 50. Typically, particulate laden gas is drawn into the plenum inlet opening 50, into the inlet openings 20 of the cyclone separators 12, and out the outlet pipes 28 by a fan 52 (See FIG. 6) located downstream of the cyclone separators 12 and connected to the outlet sections 28.

As the particulate-laden gas enters the cyclone separators 12, the tangential inlet openings 20 induce a swirling action to the gas. The swirling, particulate-laden gas swirls downwardly along the inside surface of the side wall 16 in a downwardly spiraling vortex. The centrifugal forces acting on the dust particles carried by the gas flow force these particles against the inside surface of the side wall 16. These dust particles are carried down along the inside surface and, in a properly sized and designed cyclone separator 12, these dust particles fall out the open bottom 30 of the separator 12, while the gas flow makes a sharp change in direction and flows up along the longitudinal central axis 18 of the cyclone separator 12 and out the outlet pipe 28.

Figure 7:
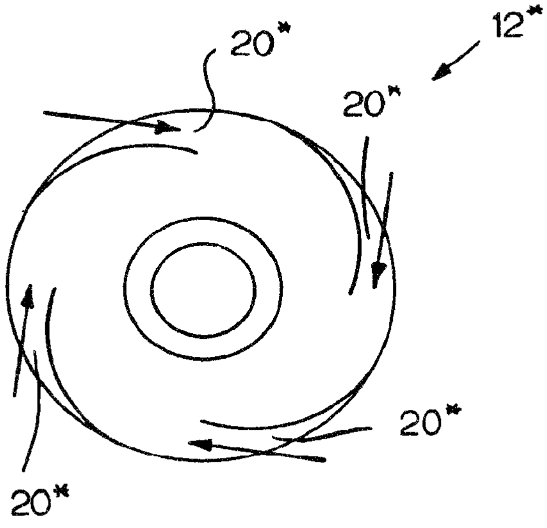
FIG. 7 is a view similar to FIG. 3, but for an alternate embodiment of a cyclone separator.

FIG. 7 shows another embodiment of a cyclone separator 12*. It may be appreciated that this cyclone separator 12* is substantially identical to the cyclone separator 12 of FIG. 3, except that it has four inlet openings 20*, spaced at intervals of 90 degrees instead of the two inlet openings 20 spaced at intervals of 180 degrees. As indicated earlier, since these inlet openings 20* can all be stamped out and bent inwardly at once, using automated equipment, it is just as inexpensive to provide many smaller inlet openings as to provide a single inlet opening. This provides better collection efficiency as well as a more even distribution of gas removal from the plenum 14.

It will be obvious to those skilled in the art that modifications may be made to the embodiments described above without departing from the scope of the present invention as claimed.

What is claimed is:

1. A method for manufacturing a cyclone separator arrangement, comprising the step of forming a cyclone separator, including the steps of:

forming a hollow cylindrical wall defining an interior and an exterior, an open first end, a second end opposite the first end, and a central longitudinal axis;

making a first L-shaped cut in the wall, beginning at said open first end, to form a first flap;

bending said first flap inwardly toward said central longitudinal axis to form a tangential inlet opening in said hollow cylindrical wall;

enclosing the open first end with a first end enclosure that defines a portion of the tangential inlet opening; and providing a gas outlet tube extending through the first end closure into the interior of said cylindrical wall along the central longitudinal axis.

2. A method for manufacturing a cyclone separator arrangement as recited in claim 1, and further comprising making a second L-shaped cut in the wall, substantially identical to the first L-shaped cut, to form a second flap; and bending said second flap inwardly toward said central longitudinal axis to form a second tangential inlet opening in said hollow cylindrical wall.

3. A method for making a cyclone separator arrangement including a step of forming a plurality of cyclone separators as recited in claim 1, and further comprising the step of enclosing a portion of each of the cyclone separators inside a plenum such that the inlet openings of said cyclone separators lie inside the plenum, and the outlet tubes of said cyclone separators extend outside of said plenum.

4. A method for making a cyclone separator arrangement including a step of forming a plurality of cyclone separators as recited in claim 2, and further comprising the step of enclosing a portion of each of the cyclone separators inside a plenum such that the inlet openings of said cyclone separators lie inside the plenum, and the outlet tubes of said cyclone separators extend outside of said plenum.

5. A method for making a cyclone separator arrangement as recited in claim 3, and further comprising the steps of causing particulate-laden gas to flow into said plenum, then into the inlet openings of the cyclone separators, separating particulates from the gas in the cyclone separators, and causing the separated gas to flow out the outlet tubes.

6. A method for making a cyclone separator arrangement as recited in claim 4, and further comprising the steps of causing particulate-laden gas to flow into said plenum, then into the inlet openings of the cyclone separators, separating particulates from the gas in the cyclone separators, and causing the separated gas to flow out the outlet tubes.

* * * * *